United States Patent
Hayasaki et al.

(10) Patent No.: US 10,396,675 B2
(45) Date of Patent: Aug. 27, 2019

(54) SWITCHING POWER SUPPLY APPARATUS

(71) Applicant: TDK Corporation, Minato-ku, Tokyo (JP)

(72) Inventors: Ryosuke Hayasaki, Tokyo (JP); Toshiki Murayama, Tokyo (JP); Ichiro Takayama, Tokyo (JP); Kazuki Iwaya, Tokyo (JP)

(73) Assignee: TDK CORPORATION, Minato-Ku, Tokyo (JP)

( * ) Notice: Subject to any disclaimer, the term of this patent is extended or adjusted under 35 U.S.C. 154(b) by 0 days.

(21) Appl. No.: 15/666,951

(22) Filed: Aug. 2, 2017

(65) Prior Publication Data

US 2018/0048240 A1 Feb. 15, 2018

(30) Foreign Application Priority Data

Aug. 10, 2016 (JP) ................. 2016-157796

(51) Int. Cl.
*H02M 3/335* (2006.01)
*H02M 3/337* (2006.01)
(Continued)

(52) U.S. Cl.
CPC ..... *H02M 3/33584* (2013.01); *H02M 3/3376* (2013.01); *H02M 3/33507* (2013.01);
(Continued)

(58) Field of Classification Search
CPC ......... H02M 3/33569; H02M 3/33507; H02M 3/3376; H02M 2001/003
(Continued)

(56) References Cited

U.S. PATENT DOCUMENTS 9,455,641 B2 9/2016 Kondo et al.
2015/0015181 A1* 1/2015 Kondo ............. H02M 3/33584
320/103
(Continued)

FOREIGN PATENT DOCUMENTS

CN 104054249 A 9/2014
CN 204244077 U 4/2015
JP 2014-121194 A 6/2014

OTHER PUBLICATIONS

Chinese Office Action for corresponding application No. 201710651069.4, dated Apr. 3, 2019, including partial English translation thereof (15 pages).

*Primary Examiner* — Nguyen Tran
(74) *Attorney, Agent, or Firm* — Flynn Thiel, P.C.

(57) ABSTRACT

A switching power supply apparatus is provided which reduces the time of application of an input voltage to a choke to suppress a peak current flowing through switch elements when a primary or secondary voltage is 0 V (or a voltage near 0 V). A DAB converter or switching power supply apparatus performs phase control to change at least either a first conduction width or a second conduction width of pairs of diagonally-arranged switch elements, constituting a primary full bridge circuit. The first conduction width is a time width in which a pulse for driving the first switch element and a pulse for driving the fourth switch element overlap temporally. The second conduction width is a time width in which a pulse for driving the second switch element and a pulse for driving the third switch element overlap temporally.

20 Claims, 5 Drawing Sheets

(51) Int. Cl.
   *H02J 7/00*      (2006.01)
   *H02M 1/00*      (2006.01)
(52) U.S. Cl.
   CPC ............... *H02J 2007/0059* (2013.01); *H02M 2001/0003* (2013.01); *H02M 2001/0032* (2013.01)
(58) Field of Classification Search
   USPC .............................................. 363/17, 16, 98
   See application file for complete search history.

(56) References Cited

U.S. PATENT DOCUMENTS

2016/0018904 A1* 1/2016 El Dokor ............... G06F 3/017
                                                      382/103
2016/0099646 A1* 4/2016 Safaee .............. H02M 3/33507
                                                      363/17

* cited by examiner

SWITCHING POWER SUPPLY APPARATUS

BACKGROUND OF THE INVENTION

1. Field of the Invention

The present invention relates to a DC/DC converter which includes a dual active bridge (DAB) circuit and transfers power in both directions.

2. Description of the Related Art

Environmental problems are becoming more serious in recent years, and construction of a sustainable society has been a global issue. In particular, the transition from a society dependent on fossil fuels such as petroleum and coal to one utilizing renewable energies such as solar energy and wind energy is an important challenge of our time. Solar energy and wind energy are temporally unstable in supply. To make use of such energies in the form of electric power, implementation of a smart grid for optimally coordinating demand and supply without waste is thus needed. Techniques of freely chargeable and dischargeable secondary batteries (rechargeable batteries) are essential to a smart grid.

Utilization of secondary batteries needs control techniques and conversion techniques of direct currents in both charging and discharging directions. A small-sized, lightweight, high-efficiency bidirectional DC/DC converter (switching power supply apparatus) is attracting attention as an important platform for such power conversion. Among various forms of circuit systems proposed, a dual active bridge (DAB) system is considered to be suitable for a high-capacity bidirectional DC/DC converter for handling high voltages and large currents. The DAB system has an advantage that the two directions of power transfer can be easily switched by phase shifts on the primary and secondary sides. The DAB system is also capable of generating a high-frequency alternating current, reducing loss during high speed switching, and reducing radiation noise from high speed switching, and is currently under intensive study.

CITATION LIST

Patent Literature

Patent Literature 1: Japanese Patent Application Laid-Open No. 2014-121194

FIG. 5 shows a circuit of a DAB switching power supply apparatus (DAB converter). A switching power supply apparatus 1 mainly includes a primary circuit 10, a secondary circuit 20, and a transformer 120 coupling the primary and secondary circuits 10 and 20. The primary circuit 10 mainly includes a smoothing circuit and a full bridge circuit intended for switching. The secondary circuit 20 mainly includes a full bridge circuit intended for rectification and a smoothing circuit. The primary circuit 10 and the secondary circuit 20 are symmetrically arranged. Both the full bridge circuits are phase-controlled by a control unit (not shown).

FIG. 6A shows a timing chart of control voltages of switch elements in the switching power supply apparatus 1 and a voltage Vp applied to and a current Ip flowing through a choke (inductor) 90. For example, suppose that the DAB switching power supply apparatus 1, or converter, is activated by applying an input voltage Vbus to the primary input terminals with a voltage V at the secondary output terminals at 0 V (or a voltage near 0 V) (see a period P1 in FIG. 6A).

A first switch element Q1 and a fourth switch element Q4 are turned ON, and a second switch element Q2 and a third switch element Q3 are turned OFF. A secondary smoothing capacitor 40 of the secondary circuit is not charged yet. In the secondary circuit, a circuit shown by the thick lines in FIG. 6B is formed, through which a large current can flow. In the primary circuit coupled via the transformer 120, a circuit shown by the thick lines is formed. Since the secondary side is equivalently short-circuited via the choke, a large current can also flow through the primary side in the period P1. This gives rise to the possibility that an excessive current Ip may flow through the first switch element Q1 and the fourth switch element Q4 of the primary circuit (see the period P1 in FIG. 6A).

Similarly, in a period P2 of FIG. 6A, in the primary circuit, the second switch element Q2 and the third switch element Q3 are turned ON, and the first switch element Q1 and the fourth switch element Q4 are turned OFF. In the secondary circuit, a sixth switch element Q6 and a seventh switch element Q7 are turned ON, and a fifth switch element Q5 and an eighth switch element Q8 are turned OFF. In the secondary circuit, a circuit shown by the thick lines in FIG. 6C is formed, through which a large current can flow. In the primary circuit coupled via the transformer 120, a circuit shown by the thick lines is formed. A large current can flow through the second switch element Q2 and the third switch element Q3. During the period P2, an excessive current Ip can thus flow through the second switch element Q2 and the third switch element Q3 (see the period P2 in FIG. 6A).

In other words, the input voltage Vbus is applied to the choke (inductor) 90 connected in series with the transformer 120 for a half period of the switching frequency. A large peak current can thus flow through the switch elements Q1 to Q4 constituting the primary circuit, with possible failures of the switch elements. Exactly the same problem can also occur if the primary and secondary roles are reversed.

Possible measures to avoid such a problem include increasing the inductance of the choke (inductor) 90 and increasing the switching frequency. However, the former measure has a disadvantage that the choke becomes large in size. The latter has a disadvantage of increasing the iron loss (loss) of the magnetic material and the switching loss.

SUMMARY OF THE INVENTION

It is therefore an object of the present invention to reduce the time of application of the input voltage to the choke to suppress a peak current flowing through the switch elements.

(1) The present invention provides a switching power supply apparatus including: a transformer configured to include a primary coil and a secondary coil; a primary bridge circuit configured to include a first leg including a first switch element and a second switch element, a first node between the first switch element and the second switch element being connected to the primary coil, and a second leg including a third switch element and a fourth switch element, a second node between the third switch element and the fourth switch element being connected to the primary coil; a secondary bridge circuit configured to include a third leg including a fifth switch element and a sixth switch element, a third node between the fifth switch element and the sixth switch element being connected to the secondary coil, and a fourth leg including a seventh switch element and an eighth switch element, a fourth node between the seventh switch element and the eighth switch element being connected to the secondary coil; a control unit configured to control the first to eighth switch elements with respective predetermined pulse widths; a first smoothing capacitor that is connected to the primary bridge circuit; and a second smoothing capacitor that is connected to the secondary bridge circuit, wherein the control unit performs phase control to change at least one of a first conduction width and a second conduction width, the first conduction width being a time width in which a pulse for driving the first switch element and a pulse for driving the fourth switch element overlap temporally, the second conduction width being a time width in which a pulse for driving the second switch element and a pulse for driving the third switch element overlap temporally.

In a DAB converter, the driving pulses of the switch elements of the primary bridge circuit during a normal operation are controlled so that the driving pulses of each of two pairs of diagonally-arranged switch elements have the same phase. In such a case, the conduction widths of the switch elements become a half period of the switching frequency. During the half period, the entire input voltage is applied to the primary circuit. If the secondary circuit is at 0 V or a low voltage near 0 V, the primary circuit coupled via the transformer also equivalently has a low impedance. A large current can thus flow through the switch elements constituting the primary bridge circuit and possibly cause a failure.

According to the invention described in the foregoing (1), the conduction width of at least any of the two pairs of diagonally-arranged switch elements can be changed. An input voltage can thus be applied to the primary circuit for only a period temporally shorter than a half period. This provides an excellent effect of suppressing the current flowing through the primary circuit and consequently contributing to protection of the switch elements.

(2) The present invention provides the switching power supply apparatus described in the foregoing (1), wherein the first node is connected to the primary coil via a first choke, and the third node is connected to the secondary coil via a second choke.

According to the invention described in the foregoing (2), the switching power supply apparatus includes the choke coils. This produces an effect of increasing the degree of freedom in design about accumulation and release of energy into/from inductors by switching operations.

(3) The present invention provides the switching power supply apparatus described in the foregoing (1) or (2), wherein at least one of the first choke and the second choke includes a leakage inductor, the leakage inductor being a leakage inductance of the transformer.

According to the invention described in the foregoing (3), the leakage inductance of the transformer can be used as a choke coil. This provides an effect that the parts count can be reduced.

(4) The present invention provides the switching power supply apparatus described in any of the foregoing (1) to (3), wherein the first node is connected to the primary coil via a series circuit including the first choke and a first capacitor in series, and the third node is connected to the secondary coil via a series circuit including the second choke and a second capacitor in series.

According to the invention described in the foregoing (4), the series connections of the choke coils and the capacitors can prevent biased magnetization of the transformer.

(5) The present invention provides the switching power supply apparatus described in any of the foregoing (1) to (4), wherein the control unit performs phase control to change both the first conduction width and the second conduction width.

According to the invention described in the foregoing (5), the conduction widths of both the pairs of diagonally-arranged switch elements can be changed. If the secondary circuit is at 0 V or a low voltage near 0 V, large currents can flow through the primary and secondary circuits coupled via the transformer. Since the conduction widths can be controlled to a period temporally shorter than a half period, there is provided an excellent effect that the two pairs of diagonally-arranged switch elements can be both protected.

(6) The present invention provides the switching power supply apparatus described in any of the foregoing (1) to (5), wherein the control unit performs phase control to change at least one of a third conduction width and a fourth conduction width, the third conduction width being a time width in which a pulse for driving the fifth switch element and a pulse for driving the eighth switch element overlap temporally, the fourth conduction width being a time width in which a pulse for driving the sixth switch element and a pulse for driving the seventh switch element overlap temporally.

A major characteristic of DAB converters is that the primary and secondary roles can be reversed by phase control. Power can therefore be transferred from the secondary side to the primary side. If the primary and secondary roles are reversed and the original secondary circuit is at 0 V or a low voltage near 0 V, large currents can flow through the original primary and secondary circuits coupled via the transformer. The driving pulses of the switch elements of the secondary bridge circuit in a DAB converter during a normal operation are such that the driving pulses of two diagonally-arranged switch elements have the same phase. The conduction widths of the switch elements here become a half period of the switching frequency. During the half period, the entire input voltage is applied to the original secondary circuit. A large current can thus flow through the original secondary circuit and possibly cause a failure.

According to the invention described in the foregoing (6), the conduction width of at least either one of the two pairs of diagonally-arranged switch elements of the original secondary bridge circuit can be changed. An input voltage can thus be applied to the original secondary circuit for only a period temporally shorter than a half period. This provides an excellent effect of suppressing the current and consequently contributing to the protection of the switch elements.

(7) The present invention provides the switching power supply apparatus described in the foregoing (6), wherein the control unit performs phase control to change both the third conduction width and the fourth conduction width.

According to the invention described in the foregoing (7), if the primary and secondary roles are reversed, the conduction widths of both pairs of diagonally-arranged switch elements of the original secondary bridge circuit can be changed. An input voltage can thus be applied to the original secondary circuit for only a period temporally shorter than a half period. This provides an excellent effect that the current can be suppressed to protect the switch elements.

(8) The present invention provides the switching power supply apparatus described in any of the foregoing (1) to (5), wherein if a voltage value of an output part of the secondary bridge circuit is small, the control unit performs phase control to narrow at least one of the first conduction width and the second conduction width, and if the voltage value of the output part of the secondary bridge circuit is large, the control unit performs phase control to widen at least one of the first conduction width and the second conduction width.

If the voltage value of the output part of the secondary bridge circuit is small, such as upon activation of the switching power supply apparatus, the smoothing capacitor on the secondary side is not charged much. This makes the secondary circuit equivalently low in impedance so that a current can flow. As a result, the apparent impedance to the primary circuit coupled via the transformer also becomes low, so that a current can flow. If an input voltage is applied to the primary circuit, the entire input voltage is applied to the choke. A large current then flows to cause a failure of the switch elements.

According to the invention described in the foregoing (8), if the voltage value of the output part of the secondary bridge circuit is small, the switch elements of the primary bridge circuit are phase-controlled to narrow the first conduction width and/or the second conduction width. This can suppress the current flowing through the primary circuit, and consequently provides an excellent effect of contributing to the protection of the switch elements.

On the other hand, if the voltage value of the output part of the secondary bridge circuit is large, the smoothing capacitor included in the secondary circuit is charged up. The voltage applied to the choke is thus low, and the secondary circuit is not conditioned to pass a large current. A large current will not flow through the primary circuit. In such a case, even if the control unit performs phase control to widen the conduction width(s), the entire input voltage will not be applied to the primary circuit so that a large current flows. If the voltage value of the output part of the secondary bridge circuit is large, the phase control to widen the first conduction width and/or the second conduction width thus provides a remarkable effect that the conversion efficiency of the switching power supply apparatus can be improved.

(9) The present invention provides the switching power supply apparatus described in any of the foregoing (1) to (5), wherein if a voltage value of an output part of the secondary bridge circuit is less than or equal to a predetermined first threshold, the control unit performs phase control to narrow at least one of the first conduction width and the second conduction width, and if the voltage value of the output part of the secondary bridge circuit is greater than a predetermined second threshold, the control unit performs phase control to widen at least one of the first conduction width and the second conduction width, the predetermined second threshold being defined to be equal to or greater than the predetermined first threshold.

According to the invention described in the foregoing (9), if the voltage value of the output part of the secondary bridge circuit is less than or equal to the predetermined first threshold, the switch elements of the primary bridge circuit are phase-controlled to narrow the first conduction width and/or the second conduction width. This can suppress the current flowing through the primary circuit, compared to when the voltage value of the output part of the secondary bridge circuit is greater than the second threshold. There is consequently provided an excellent effect of contributing to the protection of the switch elements.

Examples of the state in which the voltage value of the output part of the secondary bridge circuit is greater than the predetermined second threshold include a case when the absolute value of the second threshold is set below and near the rated output voltage, and the voltage value of the output part reaches the rated output voltage. In such a case, the smoothing capacitor included in the secondary circuit is charged up. The voltage applied to the choke is thus low, and the secondary circuit is not conditioned to pass a large current. A large current will not flow through the primary circuit. Even if the control unit performs phase control to widen the conduction width(s), the entire input voltage then will not be applied to the primary circuit so that a large current flows. If the voltage value of the output part of the secondary bridge circuit is large, the phase control to widen the first conduction width and/or the second conduction width thus provides a remarkable effect that the conversion efficiency of the switching power supply apparatus can be improved. The first threshold here is set to, for example, a value less than or equal to ⅔ of the rated output voltage, desirably less than or equal to ½ of the rated output voltage, preferably less than or equal to ⅓ of the rated output voltage. It will be understood that the first threshold may be set near 0 V. The second threshold here is preferably the same (shared) as the first threshold. The second threshold may be close to the rated output voltage. The second threshold is set to, for example, a value greater than or equal to ⅓ of the rated output voltage, desirably greater than or equal to ½ of the rated output voltage, preferably greater than or equal to ⅔ of the rated output voltage.

(10) The present invention provides the switching power supply apparatus described in the foregoing (6) or (7), wherein if a voltage value of an output part of the primary bridge circuit is small, the control unit performs phase control to narrow at least one of the third conduction width and the fourth conduction width, and if the voltage value of the output part of the primary bridge circuit is large, the control unit performs phase control to widen at least one of the third conduction width and the fourth conduction width.

As described above, a major characteristic of DAB converters is that the primary and secondary roles can be reversed by phase control. Power can therefore be transferred from the secondary side to the primary side. If the primary and secondary roles are reversed and the voltage value of the output part of the primary bridge circuit is small, the smoothing capacitor on the primary side is not charged much. This makes the primary circuit equivalently low in impedance so that a current can flow. The apparent impedance to the secondary circuit coupled via the transformer also becomes low, so that a current can flow. If an input voltage is applied to the secondary circuit, the entire input voltage is applied to the choke. A large current thus flows through the switch elements of the secondary bridge circuit to cause a failure of the switch elements.

According to the invention described in the foregoing (10), if the voltage value of the output part of the primary bridge circuit is small, the switch elements of the secondary bridge circuit are phase-controlled to narrow the third conduction width and/or the fourth conduction width. This can suppress the current flowing through the secondary circuit, and consequently provides an excellent effect of contributing to the protection of the switch elements.

On the other hand, if the voltage value of the output part of the primary bridge circuit is large, the smoothing capacitor included in the primary circuit is charged up. The voltage applied to the choke is thus low, and the primary circuit is not conditioned to pass a large current. A large current will not flow through the secondary circuit. In such a case, even if the control unit performs phase control to widen the conduction width(s), a large current will not flow through the secondary circuit. If the voltage value of the output part of the primary bridge circuit is large, the phase control to widen the third conduction width and/or the fourth conduction width thus provides a remarkable effect that the conversion efficiency of the switching power supply apparatus can be improved.

(11) The present invention provides the switching power supply apparatus described in the foregoing (6) or (7), wherein if the voltage value of the output part of the primary bridge circuit is less than or equal to a predetermined third threshold, the control unit performs phase control to narrow at least one of the third conduction width and the fourth conduction width, and if the voltage value of the output part of the primary bridge circuit is greater than a predetermined fourth threshold, the control unit performs phase control to widen at least one of the third conduction width and the fourth conduction width, the predetermined fourth threshold being defined to be equal to or greater than the predetermined third threshold.

According to the invention described in the foregoing (11), if the voltage value of the output part of the primary bridge circuit is less than or equal to the predetermined third threshold, the switch elements of the secondary bridge circuit are phase-controlled to narrow the third conduction width and/or the fourth conduction width. This can suppress the current flowing through the secondary circuit, compared to when the voltage value of the output part of the primary bridge circuit is greater than the fourth threshold. There is consequently provided an excellent effect of contributing to the protection of the switch elements.

Examples of the state in which the voltage value of the output part of the primary bridge circuit is greater than the predetermined fourth threshold include a case when the absolute value of the fourth threshold is set below and near the rated output voltage and the voltage value of the output part reaches the rated output voltage. In such a case, the smoothing capacitor included in the primary circuit is charged up. The voltage applied to the choke is thus low, and the primary circuit is not conditioned to pass a large current. A large current will not flow through the secondary circuit. In such a case, even if the control unit performs phase control to widen the conduction width(s), a large current will not flow through the secondary circuit. If the voltage value of the output part of the primary bridge circuit is large, the phase control to widen the third conduction width and/or the fourth conduction width thus provides a remarkable effect that the conversion efficiency of the switching power supply apparatus can be improved. The third threshold here is set to, for example, a value less than or equal to ⅔ of the rated output voltage, desirably less than or equal to ½ of the rated output voltage, preferably less than or equal to ⅓ of the rated output voltage. It will be understood that the third threshold may be set near 0 V. The fourth threshold here is preferably the same (shared) as the third threshold. The fourth threshold may be close to the rated output voltage. The fourth threshold is set to, for example, a value greater than or equal to ⅓ of the rated output voltage, desirably greater than or equal to ½ of the rated output voltage, preferably greater than or equal to ⅔ of the rated output voltage.

(12) The present invention provides the switching power supply apparatus described in any of the foregoing (1) to (11), wherein the control unit performs phase control so that a first conduction time slot substantially coincides with a second conduction time slot and a third conduction time slot substantially coincides with a fourth conduction time slot, the first conduction time slot being a time slot in which the pulse for driving the first switch element and the pulse for driving the fourth switch element overlap temporally, the second conduction time slot being a time slot in which the pulse for driving the fifth switch element and the pulse for driving the eighth switch element overlap temporally, the third conduction time slot being a time slot in which the pulse for driving the second switch element and the pulse for driving the third switch element overlap temporally, the fourth conduction time slot being a time slot in which the pulse for driving the sixth switch element and the pulse for driving the seventh switch element overlap temporally.

According to the invention described in the foregoing (12), the first conduction time slot and the third conduction time slot of the primary circuit can be made substantially coincident with the second conduction time slot and the fourth conduction time slot of the secondary circuit, respectively. This provides a remarkable effect that the conversion efficiency can be improved.

(13) The present invention provides the switching power supply apparatus described in the foregoing (12), wherein the control unit controls the pulse for driving the first switch element and the pulse for driving the fifth switch element to have substantially the same phases, the pulse for driving the second switch element and the pulse for driving the sixth switch element to have substantially the same phases, the pulse for driving the third switch element and the pulse for driving the seventh switch element to have substantially the same phases, and the pulse for driving the fourth switch element and the pulse for driving the eighth switch element to have substantially the same phases.

According to the invention described in the foregoing (13), the conduction time slots of the primary circuit can be made substantially coincident with those of the secondary circuit by a simple circuit configuration and phase control. This produces an effect of facilitating the control of the conduction widths.

(14) The present invention provides the switching power supply apparatus described in any of the foregoing (1) to (13), further including a detection circuit configured to detect a voltage value of an output part of the secondary bridge circuit.

According to the invention described in the foregoing (14), the voltage value of the output part of the secondary bridge circuit can be detected. Phase control can thus be performed according to the voltage value to provide the effects of loss reduction and improved conversion efficiency.

(15) The present invention provides the switching power supply apparatus described in any of the foregoing (1) to (14), wherein if a voltage value of an output part when the secondary bridge circuit serves as an output side is less than or equal to a first threshold, the control unit controls the phases so that the first conduction width becomes a first narrow width and the second conduction width becomes a second narrow width, and if the voltage value of the output part when the secondary bridge circuit serves as the output side is greater than a second threshold equal to or greater than the first threshold, the control unit controls the phases so that the first conduction width becomes a first wide width greater than the first narrow width and the second conduction width becomes a second wide width greater than the second narrow width.

According to the invention described in the foregoing (15), the phases can be controlled to provide conduction widths suitable for the voltage value of the output part when the secondary bridge circuit serves as the output side. This provides remarkable effects that an excessive current can be prevented from flowing through the primary circuit if the voltage of the output part is low, such as upon activation, and that efficient conversion can be performed if the voltage of the output part is close to that of a steady state.

(16) The present invention provides the switching power supply apparatus described in the foregoing (15), wherein a range in which the voltage value is less than or equal to the first threshold includes 0 V.

If the voltage value of the output part of the secondary bridge circuit is 0 V or close to 0 V, the smoothing capacitor on the secondary side is not charged yet. The secondary circuit becomes low in impedance, and the apparent impedance to the primary circuit coupled via the transformer also becomes low. If an input voltage is applied to the primary circuit, the entire input voltage is applied to the choke and a large current flows. This can consequently cause a failure of the switch elements.

According to the invention described in the foregoing (16), if the secondary bridge circuit serves as the output side, the phases can be controlled to provide conduction widths suitable for the voltage value of the output part. This produces effects that an excessive current can be prevented from flowing through the primary circuit if the voltage of the secondary output part is 0 V, and that efficient conversion can be performed if the voltage of the output part is close to that of a steady state.

(17) The present invention provides the switching power supply apparatus described in the foregoing (15) or (16), wherein if the voltage value is 0 V, the control unit controls the phases so that the first narrow width and the second narrow width become a finite time other than zero.

According to the invention described in the foregoing (17), if the secondary bridge circuit serves as the output side, the phases can be controlled to provide conduction widths suitable for the voltage value of the output part. This can prevent an excessive current from flowing through the primary circuit if the voltage of the secondary output part is 0 V. In addition, since the first conduction width and the second conduction width are a finite time other than zero, a current not so high as to cause a failure of the switch elements flows through the primary circuit, and a voltage is applied to secondary circuit accordingly. This provides an effect that the output voltage of the secondary circuit can be increased to reach a steady operation state.

(18) The present invention provides the switching power supply apparatus described in any of the foregoing (1) to (17), wherein the control unit controls the phases so that the pulse for driving the first switch element and the pulse for driving the second switch element do not overlap temporally, and controls the phases so that the pulse for driving the third switch element and the pulse for driving the fourth switch element do not overlap temporally.

According to the invention described in the foregoing (18), the phases are controlled so that the pulse for driving the first switch element and the pulse for driving the second switch element do not overlap temporally, and the phases are controlled so that the pulse for driving the third switch element and the pulse for driving the fourth switch element do not overlap temporally. There is thus no possibility for a large current to flow through the switch elements without a load. This produces an effect of reducing the possibilities of failures.

(19) The present invention provides the switching power supply apparatus described in any of the foregoing (1) to (18), wherein the control unit controls the phases to increase the first conduction width and the second conduction width from narrow widths to wide widths in a continuous manner or sequentially in a stepwise manner.

According to the invention described in the foregoing (19), the first conduction width and the second conduction width of the primary circuit can be increased from the narrow widths to the wide widths in a continuous manner or sequentially in a stepwise manner. This provides an effect that the possibilities of failures can be reduced since the switch elements included in the primary circuit will not be affected by an abrupt current increase.

According to the present invention, there is provided an effect of reducing an application time in which the input voltage is applied to a choke in a low impedance state, thereby suppressing a peak current flowing through the switch elements.

DETAILED DESCRIPTION OF THE PREFERRED EMBODIMENTS

Figure 1:
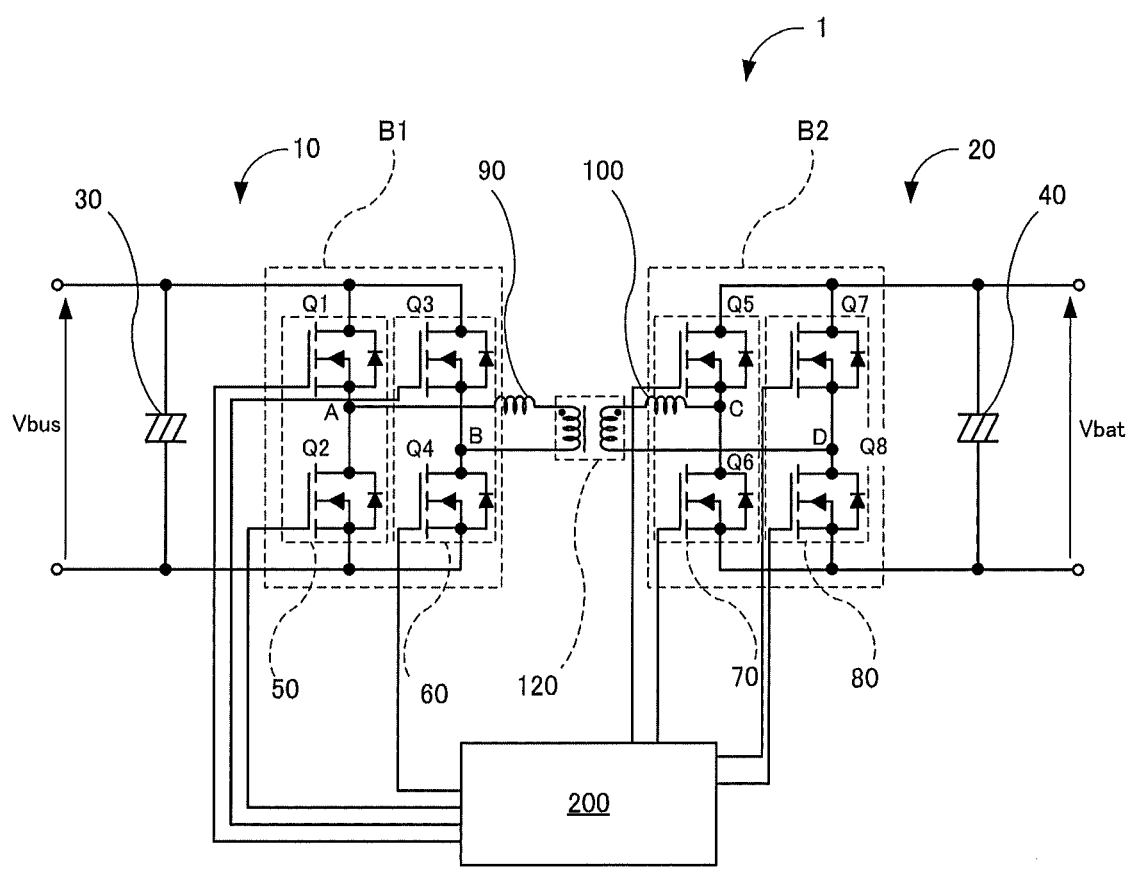
FIG. 1 is a schematic block diagram showing a switching power supply apparatus (DAB converter) according to a first embodiment of the present invention.

Embodiments of the present invention will be described below with reference to the accompanying drawings. FIGS. 1 to 4 show an example of an embodiment of the invention. In the diagrams, portions designated by the same reference numerals represent the same things.

FIG. 1 schematically shows a configuration of a switching power supply apparatus (DC/DC converter) 1 according to a first embodiment of the present invention. The switching power supply apparatus 1 is a so-called dual active bridge (DAB), and includes a primary circuit 10 and a secondary circuit 20 each including a full bridge circuit. The primary and secondary circuits 10 and 20 are coupled by an insulating transformer (transformer) 120. The transformer 120 includes a primary coil and a secondary coil.

The primary circuit 10 includes a primary bridge circuit B1, a primary smoothing capacitor 30 connected to the primary bridge circuit B1, and a choke (inductor) 90. The primary circuit 10 desirably includes a detection circuit (not shown) configured to detect a voltage value Vbus of an input part of the primary bridge circuit B1.

The secondary circuit 20 includes a secondary bridge circuit B2, a secondary smoothing capacitor 40 connected to the secondary bridge circuit B2, and a choke (inductor) 100. The secondary circuit 20 desirably includes a detection circuit (not shown) configured to detect a voltage value Vbat of an output part of the secondary bridge circuit B2.

The primary bridge circuit B1 includes a first switch element Q1, a second switch element Q2, a third switch element Q3, and a fourth switch element Q4. The primary bridge circuit B1 includes a first leg 50 and a second leg 60. The first leg 50 includes the first switch element Q1 and the second switch element Q2. A first node A between the first switch element Q1 and the second switch element Q2 is connected to one end of the primary coil of the transformer 120 via the choke (inductor) 90. The second leg 60 includes the third switch element Q3 and the fourth switch element Q4. A second node B between the third switch element Q3 and the fourth switch element Q4 is connected to the other end of the primary coil of the transformer 120.

The secondary bridge circuit B2 includes a fifth switch element Q5, a sixth switch element Q6, a seventh switch element Q7, and an eighth switch element Q8. The secondary bridge circuit B2 includes a third leg 70 and a fourth leg 80. The third leg 70 includes the fifth switch element Q5 and the sixth switch element Q6. A third node C between the fifth switch element Q5 and the sixth switch element Q6 is connected to one end of the secondary coil of the transformer 120 via the choke (inductor) 100. The fourth leg 80 includes the seventh switch element Q7 and the eighth switch element Q8. A fourth node D between the seventh switch element Q7 and the eighth switch element Q8 is connected to the other end of the secondary coil of the transformer 120. In the present embodiment, the switch elements Q1 to Q8 are each a metal-oxide-semiconductor field-effect transistor (MOSFET). The switch elements Q1 to Q8 may be other switch, elements such as an insulated gate bipolar transistor (IGBT).

The choke (inductor) 90 and the choke (inductor) 100 may be leakage inductors of the transformer 120. Both the primary circuit 10 and the secondary circuit 20 desirably include a noise filter.

The switch elements constituting the primary bridge circuit B1 and the secondary bridge circuit B2 are phase-controlled by a control unit 200. Specifically, the control unit 200 controls the first to eighth switch elements with respective predetermined pulse widths. The control unit 200 further performs phase control to change both a first conduction width and a second conduction width of the primary circuit 10. The first conduction width is a time width in which a pulse for driving the first switch element Q1 and a pulse for driving the fourth switch element Q4 overlap temporally. The second conduction width is a time width in which a pulse for driving the second switch element Q2 and a pulse for driving the third switch element Q3 overlap temporally.

At the same time, the control unit 200 performs phase control to change both a third conduction width and a fourth conduction width of the secondary circuit 20. The third conduction width is a time width in which a pulse for driving the fifth switch element Q5 and a pulse for driving the eighth switch element Q8 overlap temporally. The fourth conduction width is a time width in which a pulse for driving the sixth switch element Q6 and a pulse for driving the seventh switch element Q7 overlap temporally.

The control unit 200 here performs the phase control so that a first conduction time slot substantially coincides with a second conduction time slot, and a third conduction time slot substantially coincides with a fourth conduction time slot. The first conduction time slot is a time slot in which the pulse for driving the first switch element Q1 and the pulse for driving the fourth switch element Q4 overlap temporally. The second conduction time slot is a time slot in which the pulse for driving the fifth switch element Q5 and the pulse for driving the eighth switch element Q8 overlap temporally. The third conduction time slot is a time slot in which the pulse for driving the second switch element Q2 and the pulse for driving the third switch element Q3 overlap temporally. The fourth conduction time slot is a time slot in which the pulse for driving the sixth switch element Q6 and the pulse for driving the seventh switch element Q7 overlap temporally.

The control unit 200 desirably controls the pulse for driving the first switch element Q1 and the pulse for driving the fifth switch element Q5 to have substantially the same phases. The control unit 200 desirably controls the pulse for driving the second switch element Q2 and the pulse for driving the sixth switch element Q6 to have substantially the same phases. The control unit 200 desirably controls the pulse for driving the third switch element Q3 and the pulse for driving the seventh switch element Q7 to have substantially the same phases. The control unit 200 desirably controls the pulse for driving the fourth switch element Q4 and the pulse for driving the eighth switch element Q8 to have substantially the same phases.

Next, an operation of the switching power supply apparatus 1 will be described with reference to FIGS. 2A to 3B.

Figure 2A:
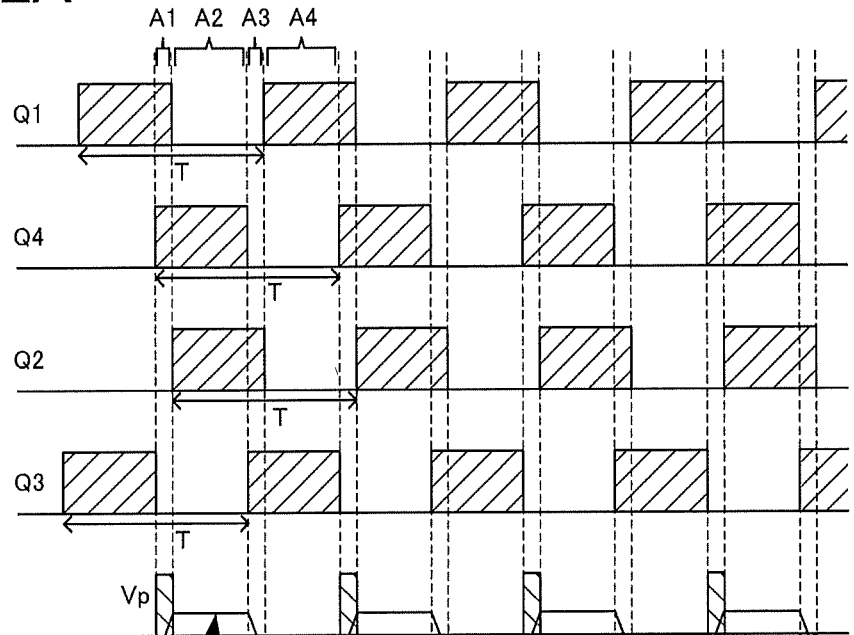
FIG. 2A shows a timing chart of control pulses for respective switch elements of a primary full bridge circuit and temporal changes in a voltage applied to a primary circuit and a current flowing through the primary circuit when the conduction widths are narrow widths.
Figure 2B:
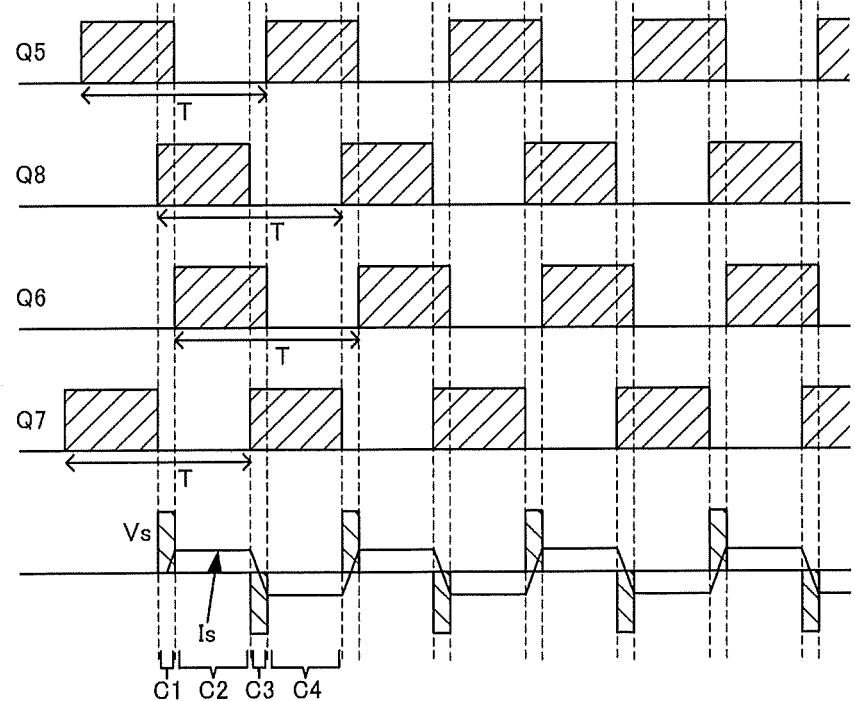
FIG. 2B shows a timing chart of control pulses for respective switch elements of a secondary full bridge circuit and temporal changes in an output voltage of a secondary circuit and a current flowing through the secondary circuit when the conduction widths are narrow widths.

FIGS. 2A and 2B show a case in which the voltage value Vbat of the output part when the secondary bridge circuit B2 serves as an output side is less than or equal to a first threshold. The voltage value Vbat of the output part of the secondary circuit 20 may be 0 V. The first threshold is 50 V, for example. The first threshold is set to a value less than or equal to $2/3$ of the rated output voltage, desirably less than or equal to $1/2$ of the rated output voltage, preferably less than or equal to $1/3$ of the rated output voltage. It will be understood that the first threshold may be set near 0 V.

FIG. 2A shows a timing chart of the control unit 200 controlling the switch elements Q1 to Q4 of the primary bridge circuit B1 constituting the primary circuit 10 of the switching power supply apparatus 1, and temporal changes in a voltage Vp applied to the choke (inductor) 90 and a current Ip flowing through the choke (inductor) 90. The pulses for driving the first switch element Q1 and the pulses for driving the second switch element Q2 have the same period T. The control unit 200 shifts the phase of the pulses for driving the first switch element Q1 from that of the pulses for driving the second switch element Q2 by 180° so that the driving pulses of the two switch elements do not overlap temporally. In fact, even in a period in which the first switch element Q1 is turned ON and the second switch element Q2 is turned OFF or a period in which the first switch element Q1 is turned OFF and the second switch element Q2 is turned ON, the first switch element Q1 and the second switch element Q2 may be simultaneously ON in a transition region of switching. In such a case, a through current can flow. To prevent this, there are provided periods (short-circuit prevention time) in which both the first switch element Q1 and the second switch element Q2 are simultaneously OFF.

Similarly, the pulses for driving the third switch element Q3 and the pulses for driving the fourth switch elements Q4 have the same period T. The control unit 200 shifts the phase of the pulses for driving the third switch element Q3 from that of the pulses for driving the fourth switch element Q4 by 180° so that the driving pulses of the two switch elements do not overlap temporally. In fact, even in a period in which the third switch element Q3 is turned ON and the fourth switch element Q4 is turned OFF or a period in which the third switch element Q3 is turned OFF and the fourth switch element Q4 is turned ON, the third switch element Q3 and the fourth switch element Q4 may be simultaneously ON in a transition region of switching. In such a case, a through current can flow. To prevent this, there are provided periods (short-circuit prevention times) in which both the third switch element Q3 and the fourth switch element Q4 are simultaneously OFF.

As shown in FIG. 2A, the control unit 200 turns ON the first switch element Q1 and the fourth switch element Q4 during a period A1. The period A1 refers to the time width in which a pulse for driving the first switch element Q1 and a pulse for driving the fourth switch element Q4 overlap temporally, i.e., the first conduction width. Similarly, the control unit 200 turns ON the second switch element Q2 and the third switch element Q3 during a period A3. The period A3 refers to the time width in which a pulse for driving the second switch element Q2 and a pulse for driving the third switch element Q3 overlap temporally, i.e., the second conduction width.

The control unit 200 controls the phases so that the period A1 becomes a first narrow width which is a finite time other than zero and the period A3 becomes a second narrow width which is a finite time other than zero even if the voltage value of the output part is 0 V. In the present embodiment, the first narrow width and the second narrow width are equal, i.e., A1=A3. During the period A1, the voltage applied to the choke (inductor) 90 has an absolute value Vp. The magnitude of the flowing current Ip satisfies the relationship of Vp=L1×(dIp/dt), where L1 is the self-inductance of the choke (inductor) 90. In other words, Ip is proportional to the period A1 (first narrow width). This shows that the period A1 (first narrow width) can be reduced to reduce Ip.

A predetermined second threshold is defined to be equal to or greater than the predetermined first threshold. In the present embodiment, if the voltage value of the output part of the secondary bridge circuit is less than or equal to the first threshold, the control unit 200 performs phase control to narrow the first conduction width and the second conduction width. The control unit 200 thereby produces an effect of suppressing a peak current, compared to when the voltage value of the output part of the secondary bridge circuit is greater than the second threshold.

FIG. 2B shows a timing chart of the control unit 200 controlling the switch elements Q5 to Q8 of the secondary bridge circuit B2 constituting the secondary circuit 20 of the switching power supply apparatus 1, and temporal changes in a voltage Vs applied to the choke (inductor) 100 and a current Is flowing through the choke (inductor) 100 at substantially the same time as in FIG. 2A.

The pulses for driving the fifth switch element Q5 and the pulses for driving the sixth switch element Q6 have the same period T. The control unit 200 shifts the phase of the pulses for driving the fifth switch element Q5 from that of the pulses for driving the sixth switch element Q6 by 180° so that the driving pulses of the two switch elements do not overlap temporally. In fact, even in a period in which the fifth switch element Q5 is turned ON and the sixth switch element Q6 is turned OFF or a period in which the fifth switch element Q5 is turned OFF and the sixth switch element Q6 is turned ON, the fifth switch element Q5 and the sixth switch element Q6 may be simultaneously ON in a transition region of switching. In such a case, a through current can flow. To prevent this, there are provided periods (short-circuit prevent times) in which both the fifth switch element Q5 and the sixth switch element Q6 are simultaneously OFF.

Similarly, the pulses for driving the seventh switch element Q7 and the pulses for driving the eighth switch elements Q8 have the same period T. The control unit 200 shifts the phase of the pulses for driving the seventh switch elements Q7 from that of the pulses for driving the eighth switch element Q8 by 180° so that the driving pulses of the two switch elements do not overlap temporally. In fact, even in a period in which the seventh switch element Q7 is turned ON and the eighth switch element Q8 is turned OFF or a period in which the seventh switch element Q7 is turned OFF and the eighth switch element Q8 is turned ON, the seventh switch element Q7 and the eighth switch element Q8 may be simultaneously ON in a transition region of switching. In such a case, a through current can flow. To prevent this, there are provided periods (short-circuit prevention periods) in which both the seventh switch element Q7 and the eighth switch element Q8 are simultaneously OFF.

As shown in FIG. 2B, the control unit 200 turns ON the fifth switch element Q5 and the eighth switch element Q8 during a period C1. The period C1 refers to the time width in which a pulse for driving the fifth switch element Q5 and a pulse for driving the eighth switch element Q8 overlap temporally, i.e., the third conduction width. Similarly, the control unit 200 turns ON the sixth switch element Q6 and the seventh switch element Q7 during a period C3. The period C3 refers to the time width in which a pulse for driving the sixth switch element Q6 and a pulse for driving the seventh switch element Q7 overlap temporally, i.e., the fourth conduction width.

The control unit 200 desirably controls the pulses for driving the first switch element Q1 and the pulses for driving the fifth switch element Q5 to have substantially the same phases. The control unit 200 desirably controls the pulses for driving the second switch element Q2 and the pulses for driving the sixth switch element Q6 to have substantially the same phases. The control unit 200 desirably controls the pulses for driving the third switch element Q3 and the pulses for driving the seventh switch element Q7 to have substantially the same phases. The control unit 200 desirably controls the pulses for driving the fourth switch element Q4 and the pulses for driving the eighth switch element Q8 to have substantially the same phases. All the periods A1, A3, C1, and C3 are desirably equal.

The control unit 200 controls the phases so that the period C1 becomes a third narrow width which is a finite time other than zero and the period C3 becomes a fourth narrow width which is a finite time other than zero even if the voltage value of the output part is 0 V. In the present embodiment, the third narrow width and the fourth narrow width are equal, i.e., C1=C3. During the period C1, the voltage applied to the choke (inductor) 100 has an absolute value Vs. If the switch elements Q1, Q4, Q5, and Q8 are ON, Vbus is applied to the primary circuit 10 during the period A1 (=C1). The voltage Vs is applied to the choke (inductor) 100 of the secondary circuit 20 according to the tap rate of the transformer 120. The magnitude of the current Is flowing here satisfies the relationship of Vs=L2×(dIs/dt), where L2 is the self-inductance of the choke (inductor) 100. It can be seen that the period C1 (third narrow width) can be reduced to reduce Is. In other words, according to the present embodiment, if the initial voltage value of the output part of the secondary bridge circuit is small, the control unit 200 performs phase control to narrow the third conduction width and the fourth conduction width.

Similarly, if the switch elements Q2, Q3, Q6, and Q7 are turned ON, Vp of opposite polarity is applied to the choke (inductor) 90 of the primary circuit 10 during the period A3 (=C3). The voltage Vs of opposite polarity is applied to the choke (inductor) 100 of the secondary circuit 20 according to the tap rate of the transformer 120. A further description will be omitted since the subsequent operations are similar to the foregoing.

In summary, the predetermined second threshold is defined to be equal to or greater than the predetermined first threshold. If the voltage value of the output part of the secondary bridge circuit is less than or equal to the first threshold, the switch elements of the primary bridge circuit are phase-controlled to narrow the first conduction width and/or the second conduction width. This can suppress the current flowing through the primary circuit, compared to when the voltage value of the output part is greater than the second threshold. As a result, an excellent effect of contributing to protection of the switch elements is provided.

Figure 3A:
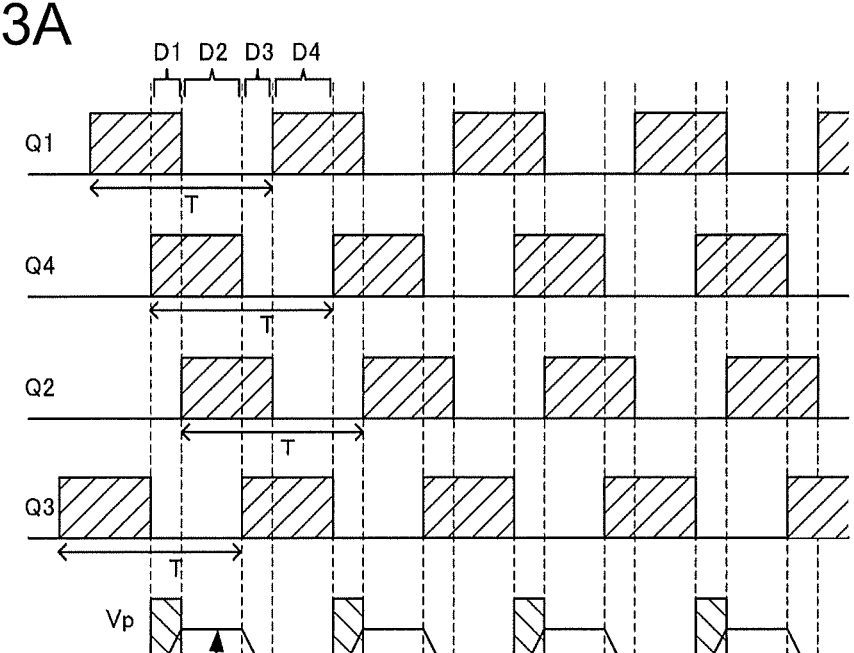
FIG. 3A shows a timing chart of the control pulses for the respective switch elements of the primary full bridge circuit and temporal changes in the voltage applied to the primary circuit and the current flowing through the primary circuit when the conduction widths are wide widths.
Figure 3B:
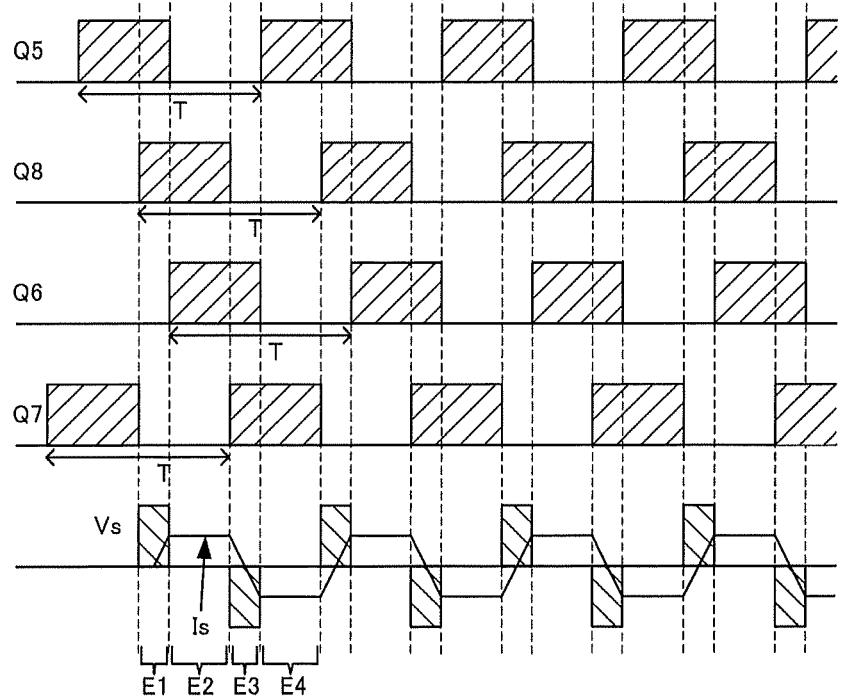
FIG. 3B shows a timing chart of the control pulses for the respective switch elements of the secondary full bridge circuit and temporal changes in the output voltage of the secondary circuit and the current flowing through the secondary circuit when the conduction widths are wide widths.

FIGS. 3A and 3B show timing charts and temporal changes in the voltage Vp applied to the choke (inductor) 90 and the current Ip flowing through the choke (inductor) 90 if the voltage value of the output part when the secondary bridge circuit B2 serves as the output side is greater than the first threshold (suppose that the first threshold and the foregoing second threshold are integrated and shared each other). The first threshold (second threshold) may be the value Vbat which is determined by the input voltage Vbus input to the primary circuit 10 and the tap rate of the transformer 120. The second threshold is preferably the same (shared) as the first threshold. However, the present invention is not limited thereto, and the second threshold may be close to the rated output voltage. For example, the second threshold is set to a value greater than or equal to ⅓ of the rated output voltage, desirably greater than or equal to ½ of the rated output voltage, preferably greater than or equal to ⅔ of the rated output voltage.

As shown in FIG. 3A, the control unit 200 turns ON the first switch element Q1 and the fourth switch element Q4 during a period D1. The period D1 refers to the time width in which a pulse for driving the first switch element Q1 and a pulse for driving the fourth switch element Q4 overlap temporally, i.e., the first conduction width. Similarly, the control unit 200 turns ON the second switch element Q2 and the third switch element Q3 during a period D3. The period D3 refers to the time width in which a pulse for driving the second switch element Q2 and a pulse for driving the third switch element Q3 overlap temporally, i.e., the second conduction width.

In other words, the control unit 200 controls the phases so that the period D1 becomes a first wide width temporally longer than the first narrow width, and the period D3 becomes a second wide width temporally longer than the second narrow width. In the present embodiment, the first wide width and the second wide width are equal, i.e., D1=D3.

As shown in FIG. 3B, the control unit 200 turns ON the fifth switch element Q5 and the eighth switch element Q8 during a period E1. The period E1 refers to the time width in which a pulse for driving the fifth switch element Q5 and a pulse for driving the eighth switch element Q8 overlap temporally, i.e., the third conduction width. Similarly, the control unit 200 turns ON the sixth switch element Q6 and the seventh switch element Q7 during a period E3. The period E3 refers to the time period in which a pulse for driving the sixth switch element Q6 and a pulse for driving the seventh switch element Q7 overlap temporally, i.e., the fourth conduction width.

The control unit 200 controls the phases so that the period E1 becomes a third wide width temporally longer than the third narrow width, and the period E3 becomes a fourth wide width temporally longer than the fourth narrow width. In the present embodiment, the third wide width and the fourth wide width are equal, i.e., E1=E3. All the periods D1, D3, E1, and E3 are desirably equal.

Now, suppose that the control unit 200 controls the phases so that the first, second, third, and fourth conduction widths increase from the first narrow width to the first wide width in a continuous manner or sequentially in a stepwise manner. Since the voltage Vp applied to and the current Ip flowing through the choke (inductor) 90 increase gradually, no excessive current flows through the switch elements of the primary circuit 10. This reduces the possibility of a failure of the switch elements. Similarly, since the voltage Vs applied to and the current Is flowing through the choke (inductor) 100 of the secondary circuit 20 increase gradually, no excessive current flows through the switch elements of the secondary circuit 20. This reduces the possibility of a failure of the switch elements.

Specifically, if the voltage value of the output part when the secondary bridge circuit B2 serves as the output side is less than or equal to the first threshold, the control unit 200 controls the phases so that the first conduction width becomes the first narrow width and the second conduction width becomes the second narrow width. If the voltage value of the output part when the secondary bridge circuit B2 serves as the output side is greater than the second threshold which is equal to or greater than the first threshold, the control unit 200 controls the phases so that the first conduction width becomes the first wide width greater than the first narrow width and the second conduction width becomes the second wide width greater than the second narrow width. This provides an effect that the output voltage can be increased without an excessive current flowing through the switch elements.

Figure 6A:
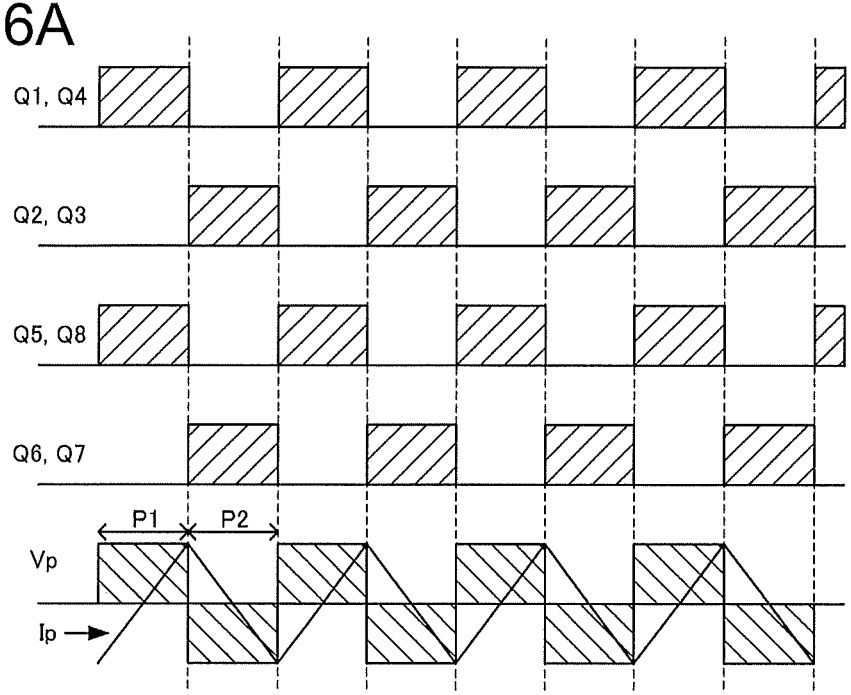
FIG. 6A shows a timing chart of control pulses for switch elements constituting the DAB converter, and temporal changes in a voltage applied to a primary circuit and a current flowing through the primary circuit.
Figure 6B:
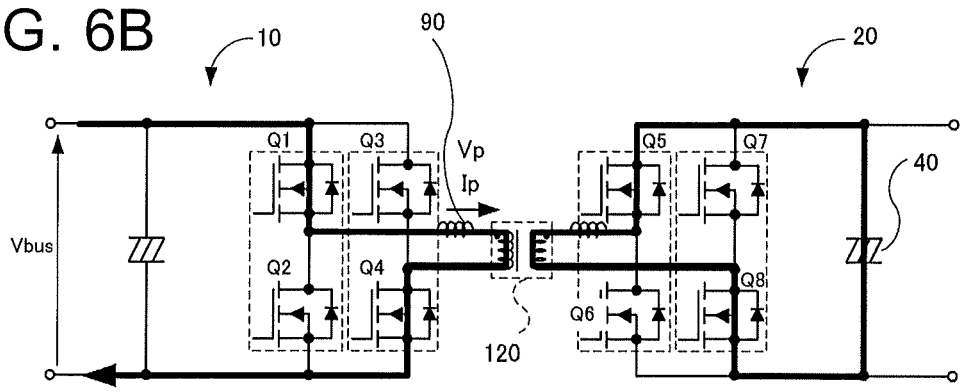
FIG. 6B is an explanatory diagram for describing the conduction in a period P1.
Figure 6C:
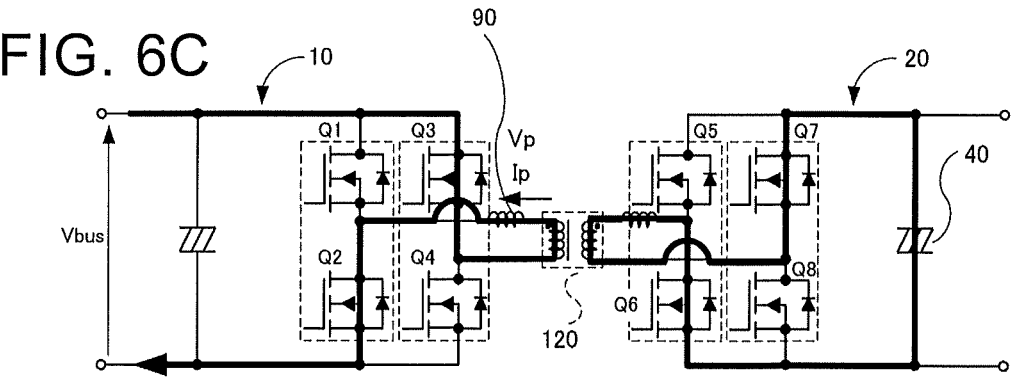
FIG. 6C is an explanatory diagram for describing the conduction in a period P2.

The control unit 200 performs phase control on the primary bridge circuit B1 to reduce the phase difference between the first switch element Q1 and the fourth switch element Q4 and the phase difference between the second switch element Q2 and the third switch element Q3 until the state shown in FIGS. 6A and 6B is eventually reached. After the phase difference between the first switch element Q1 and the fourth switch element Q4 and the phase difference between the second switch element Q2 and the third switch element Q3 become 0°, the output voltage rises to the rated voltage at once to enter a normal operation state.

The same operation as the foregoing also occurs if the primary and secondary roles are reversed, i.e., when power is transmitted from the secondary circuit 20 to the primary circuit 10 in FIG. 1.

The control unit 200 may measure the voltage value of the output part of the secondary bridge circuit B2 by using a detection circuit (not shown). If the voltage value is small, the control unit 200 may perform phase control to narrow the first conduction width and/or the second conduction width. If the voltage value of the output part of the secondary bridge circuit B2 is large, the control unit 200 may perform phase control to widen the first conduction width and/or the second conduction width.

Suppose that the primary and secondary roles are reversed, i.e., the secondary circuit 20 in FIG. 1 performs discharging and the primary circuit 10 charging. The control unit 200 may measure the voltage value of the output part of the primary bridge circuit B1 by using a detection circuit (not shown). If the voltage value is small, the control unit 200 may perform phase control to narrow the third conduction width and/or the fourth conduction width. If the voltage value of the output part of the primary bridge circuit B1 is large, the control unit 200 may perform phase control to widen the third conduction width and/or the fourth conduction width.

Figure 4:
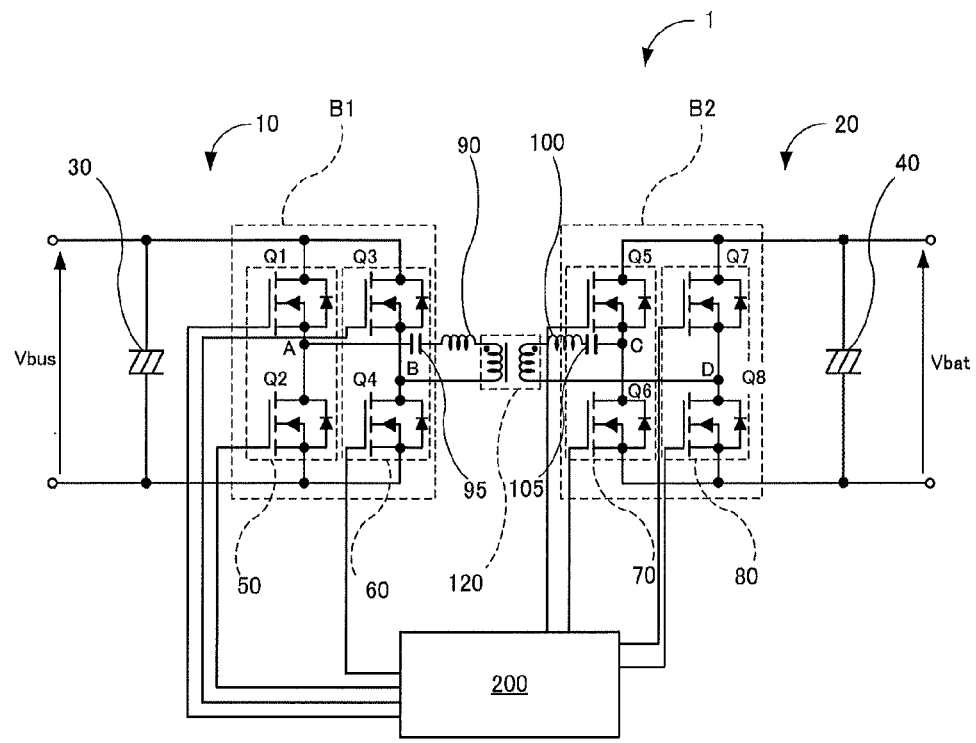
FIG. 4 is a schematic block diagram showing a switching power supply apparatus (DAB converter) according to a second embodiment of the present invention.
Figure 5:
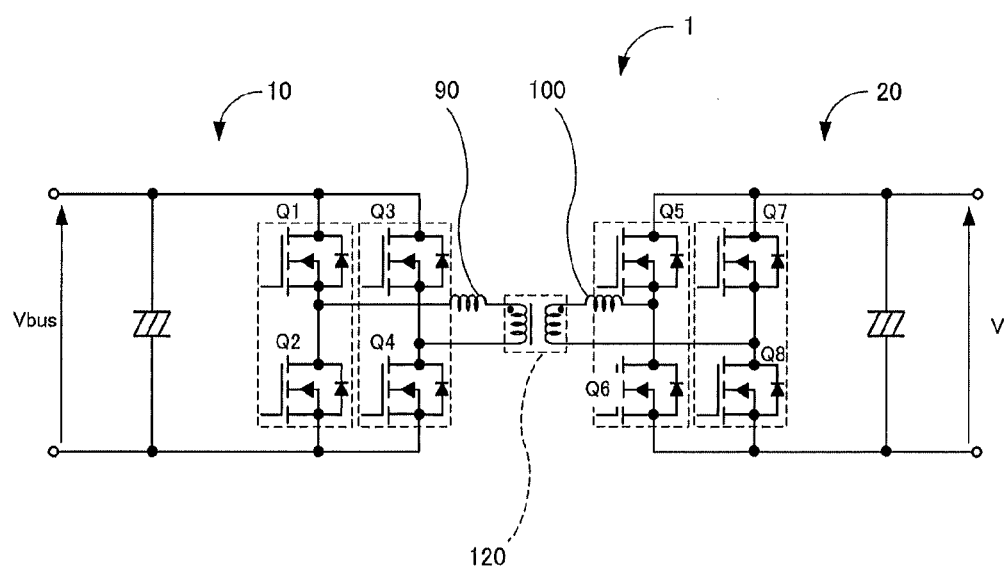
FIG. 5 is a schematic block diagram showing a DAB converter.

FIG. 4 schematically shows a configuration of a switching power supply apparatus (DC/DC converter) 1 according to a second embodiment of the present invention. The switching power supply apparatus 1 according to the second embodiment is a so-called LLC series resonant converter. More specifically, the first node A connecting the first switch element Q1 and the second switch element Q2 is connected to the primary coil of the transformer 120 via a series circuit including the first choke 90 and a first capacitor 95 in series. The third node C connecting the fifth switch element Q5 and the sixth switch element Q6 is connected to the secondary coil of the transformer 120 via a series circuit including the second choke 100 and a second capacitor 105 in series. The rest of the configuration is the same as that of the switching power supply apparatus 1 according to the first embodiment. The conduction widths of the switch elements can be controlled by phase control.

LLC series resonant circuits can implement soft switching with low switching loss and a small surge current by a simple circuit configuration. The conduction widths of the switch elements can be controlled by phase control when a large current may flow through the primary circuit and the secondary circuit of an LLC series resonant circuit, such as upon activation. This provides an excellent effect that the switch elements can be effectively protected.

It will be understood that the DC/DC converters or switching power supply apparatuses according to the present invention are not limited to the foregoing embodiments, and various modifications may be made without departing from the gist of the present invention. For example, in the foregoing embodiments, the first choke or the series circuit including the first choke and the first capacitor in series is described to be connected between the first node A and the primary coil of the transformer. However, the present invention is not limited thereto. The first choke or the series circuit including the first choke and the first capacitor in series may be connected between the second node B and the primary coil of the transformer. In the foregoing embodiments, the second choke or the series circuit including the second choke and the second capacitor in series is described to be connected between the third node C and the secondary coil of the transformer. However, the present invention is not limited thereto. The second choke or the series circuit including the second choke and the second capacitor in series may be connected between the fourth node D and the secondary coil of the transformer.

The entire disclosure of Japanese Patent Application No. 2016-157796 filed Aug. 10, 2016 including specification, claims, drawings, and summary are incorporated herein by reference in its entirety.

REFERENCE SIGNS LIST 1 switching power supply apparatus
10 primary circuit
20 secondary circuit
30 primary smoothing capacitor
40 secondary smoothing capacitor
50 first leg
60 second leg
70 third leg
80 fourth leg
90 choke (inductor)
95 first capacitor
100 choke (inductor)
105 second capacitor
120 transformer
200 control unit
B1 primary bridge circuit
B2 secondary bridge circuit
Q1 first switch element
Q2 second switch element
Q3 third switch element
Q4 fourth switch element
Q5 fifth switch element
Q6 sixth switch element
Q7 seventh switch element
Q8 eighth switch element
A first node
B second node
C third node
D fourth node

What is claimed is:

1. A switching power supply apparatus comprising:
a transformer configured to include a primary coil and a secondary coil;
a primary bridge circuit configured to include
a first leg including a first switch element and a second switch element, a first node between the first switch element and the second switch element being connected to the primary coil, and
a second leg including a third switch element and a fourth switch element, a second node between the third switch element and the fourth switch element being connected to the primary coil;
a secondary bridge circuit configured to include
a third leg including a fifth switch element and a sixth switch element, a third node between the fifth switch element and the sixth switch element being connected to the secondary coil, and
a fourth leg including a seventh switch element and an eighth switch element, a fourth node between the seventh switch element and the eighth switch element being connected to the secondary coil;
a control unit configured to control the current flowing through switch elements with respective predetermined pulse widths by maintaining a constant first conduction width and a constant second conduction width during a first time period when a voltage value of the output of the secondary bridge circuit is greater than a predetermined output voltage and perform phase control by changing at least one of the first conduction width and the second conduction width during a second time period when a voltage value of the output of the secondary bridge circuit is less than the predetermined output voltage, the first conduction width being a time width in which a pulse for driving the first switch element and a pulse for driving the fourth switch element overlap temporally, the second conduction width being a time width in which a pulse for driving the second switch element and a pulse for driving the third switch element overlap temporally;

a first smoothing capacitor that is connected to the primary bridge circuit; and
a second smoothing capacitor that is connected to the secondary bridge circuit.

2. The switching power supply apparatus according to claim 1, wherein
the first node is connected to the primary coil via a first choke, and
the third node is connected to the secondary coil via a second choke.

3. The switching power supply apparatus according to claim 2, wherein
at least one of the first choke and the second choke includes a leakage inductor, the leakage inductor being a leakage inductance of the transformer.

4. The switching power supply apparatus according to claim 3, wherein
the first node is connected to the primary coil via a series circuit including the first choke and a first capacitor in series, and
the third node is connected to the secondary coil via a series circuit including the second choke and a second capacitor in series.

5. The switching power supply apparatus according to claim 1, wherein
the control unit is configured to perform phase control by changing both the first conduction width and the second conduction width.

6. The switching power supply apparatus according to claim 1, wherein
the control unit is also configured to perform phase control by changing at least one of a third conduction width and a fourth conduction width, the third conduction width being a time width in which a pulse for driving the fifth switch element and a pulse for driving the eighth switch element overlap temporally, the fourth conduction width being a time width in which a pulse for driving the sixth switch element and a pulse for driving the seventh switch element overlap temporally.

7. The switching power supply apparatus according to claim 6, wherein
the control unit is configured to perform phase control by changing both the third conduction width and the fourth conduction width.

8. The switching power supply apparatus according to claim 1, wherein
if a voltage value of an output part of the secondary bridge circuit is small, the control unit performs phase control to narrow at least one of the first conduction width and the second conduction width, and
if the voltage value of the output part of the secondary bridge circuit is large, the control unit performs phase control to widen at least one of the first conduction width and the second conduction width.

9. The switching power supply apparatus according to claim 1, wherein
if a voltage value of an output part of the secondary bridge circuit is less than or equal to a predetermined first threshold, the control unit performs phase control to narrow at least one of the first conduction width and the second conduction width, and
if the voltage value of the output part of the secondary bridge circuit is greater than a predetermined second threshold, the control unit performs phase control to widen at least one of the first conduction width and the second conduction width, the predetermined second threshold being defined to be equal to or greater than the predetermined first threshold.

10. The switching power supply apparatus according to claim 6, wherein
if a voltage value of an output part of the primary bridge circuit is small, the control unit performs phase control to narrow at least one of the third conduction width and the fourth conduction width, and
if the voltage value of the output part of the primary bridge circuit is large, the control unit performs phase control to widen at least one of the third conduction width and the fourth conduction width.

11. The switching power supply apparatus according to claim 6, wherein
if the voltage value of the output part of the primary bridge circuit is less than or equal to a predetermined third threshold, the control unit performs phase control to narrow at least one of the third conduction width and the fourth conduction width, and
if the voltage value of the output part of the primary bridge circuit is greater than a predetermined fourth threshold, the control unit performs phase control to widen at least one of the third conduction width and the fourth conduction width, the predetermined fourth threshold being defined to be equal to or greater than the predetermined third threshold.

12. The switching power supply apparatus according to claim 1, wherein
the control unit is configured to perform phase control so that a first conduction time slot substantially coincides with a second conduction time slot and a third conduction time slot substantially coincides with a fourth conduction time slot, the first conduction time slot being a time slot in which the pulse for driving the first switch element and the pulse for driving the fourth switch element overlap temporally, the second conduction time slot being a time slot in which the pulse for driving the fifth switch element and the pulse for driving the eighth switch element overlap temporally, the third conduction time slot being a time slot in which the pulse for driving the second switch element and the pulse for driving the third switch element overlap temporally, the fourth conduction time slot being a time slot in which the pulse for driving the sixth switch element and the pulse for driving the seventh switch element overlap temporally.

13. The switching power supply apparatus according to claim 12, wherein
the control unit controls
the pulse for driving the first switch element and the pulse for driving the fifth switch element to have substantially the same phases,
the pulse for driving the second switch element and the pulse for driving the sixth switch element to have substantially the same phases,
the pulse for driving the third switch element and the pulse for driving the seventh switch element to have substantially the same phases, and
the pulse for driving the fourth switch element and the pulse for driving the eighth switch element to have substantially the same phases.

14. The switching power supply apparatus according to claim 1, further comprising a detection circuit configured to detect a voltage value of an output part of the secondary bridge circuit.

15. The switching power supply apparatus according to claim 1, wherein if a voltage value of an output part when the secondary bridge circuit serves as an output side is less than or equal to a first threshold, the control unit controls phases so that the first conduction width becomes a first narrow width and the second conduction width becomes a second narrow width, and if the voltage value of the output part when the secondary bridge circuit serves as the output side is greater than a second threshold equal to or greater than the first threshold, the control unit controls phases so that the first conduction width becomes a first wide width greater than the first narrow width and the second conduction width becomes a second wide width greater than the second narrow width.

16. The switching power supply apparatus according to claim 15, wherein a range in which the voltage value is less than or equal to the first threshold includes 0 V.

17. The switching power supply apparatus according to claim 15, wherein if the voltage value is 0 V, the control unit controls phases so that the first narrow width and the second narrow width become a finite time other than zero.

18. The switching power supply apparatus according to claim 1, wherein the control unit controls phases so that the pulse for driving the first switch element and the pulse for driving the second switch element do not overlap temporally, and controls phases so that the pulse for driving the third switch element and the pulse for driving the fourth switch element do not overlap temporally.

19. The switching power supply apparatus according to claim 1, wherein the control unit is configured to control phases by increasing the first conduction width and the second conduction width from narrow widths to wide widths in a continuous manner or sequentially in a stepwise manner.

20. The switching power supply apparatus according to claim 19, wherein the control unit is configured to control phases by increasing the first conduction width and the second conduction width from narrow widths to wide widths in a continuous manner.

\* \* \* \* \*